(12) United States Patent
Piciaccia et al.

(10) Patent No.: US 9,917,412 B1
(45) Date of Patent: Mar. 13, 2018

(54) OPTICAL AMPLIFIERS WITH LIQUID CRYSTAL DEVICE

(71) Applicant: Cisco Technology, Inc., San Jose, CA (US)

(72) Inventors: Stefano Piciaccia, Milan (IT); Lorenzo Ghioni, Casalmaiocco (IT); Walid Wakim, Aurora, IL (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 15/343,785

(22) Filed: Nov. 4, 2016

(51) Int. Cl.
| | |
|---|---|
| *H01S 3/30* | (2006.01) |
| *H01S 3/106* | (2006.01) |
| *H01S 3/094* | (2006.01) |
| *H01S 3/067* | (2006.01) |
| *H01S 3/16* | (2006.01) |

(52) U.S. Cl.
CPC ........ *H01S 3/1065* (2013.01); *H01S 3/06754* (2013.01); *H01S 3/06758* (2013.01); *H01S 3/094003* (2013.01); *H01S 3/1608* (2013.01); *H01S 3/06762* (2013.01); *H01S 3/06766* (2013.01); *H01S 2301/02* (2013.01)

(58) Field of Classification Search
CPC .............. H01S 3/1065; H01S 3/06758; H01S 3/094003; H01S 3/1608; H01S 3/06754; H01S 3/06762; H01S 3/06766; H01S 2301/02
See application file for complete search history.

(56) References Cited

U.S. PATENT DOCUMENTS

| | | | | |
|---|---|---|---|---|
| 6,268,954 B1 * | 7/2001 | Cheng | ............ | G02B 6/2746 359/337 |
| 6,731,424 B1 * | 5/2004 | Wu | ............ | H01S 5/50 359/337.1 |
| 9,166,721 B2 | 10/2015 | Willner et al. | | |
| 9,271,058 B2 | 2/2016 | Lord | | |
| 2015/0263477 A1 * | 9/2015 | Onaka | ............ | G02F 1/13318 372/6 |

(Continued)

OTHER PUBLICATIONS

S.P. Parry, et al., "An ultra flat Erbium doped fibre amplifier with wide dynamic range using an adaptive gain flattening Filter", in Optical Amplifiers and Their Applications, A. Mecozzi, M. Shimizu, and J. Zyskind, eds., vol. 44 of OSA Trends in Optics and Photonics (Optical Society of America, 2000), paper OMD9, Jul. 9, 2000, 4 pages.

(Continued)

*Primary Examiner* — Kinam Park
(74) *Attorney, Agent, or Firm* — Edell, Shapiro & Finnan, LLC (57) ABSTRACT

An optical amplifier may comprise a first gain stage and a second gain stage. Each of the first and second gain stages may comprise a laser pump and an active fiber. A liquid crystal device may be coupled between an output of the first gain stage and an input of the second gain stage. A control unit may be coupled to the first and second gain stages, liquid crystal device and configured to control the first and second gain stages, and the liquid crystal device to provide a switchable gain. Light may pass through the first and second gain stages and be amplified by the first and second gain stages. The light amplified by the first gain stage may pass through the liquid crystal device and may be filtered by the liquid crystal device.

20 Claims, 5 Drawing Sheets

(56) References Cited

U.S. PATENT DOCUMENTS

2015/0280391 A1* 10/2015 Kachita .............. H01S 3/06758
359/337.11
2016/0173202 A1 6/2016 Kelly

OTHER PUBLICATIONS

Jun Kye Bae, et al., "Automatic EDFA gain spectrum equalization using LPFGs on divided coil heaters", Optical Fiber communication Conference and Exposition and The National Fiber Optic Engineers Conference, OSA Technical Digest Series (CD) (Optical Society of America, 2007), paper JThA22, Mar. 27, 2007, ISBN: 1-55752-830-6, 3 pages.

Hyo Sang Kim, et al., "Actively Gain-Flattened Erbium-Doped Fiber Amplifier Over 35 nm by Using All-Fiber Acoustooptic Tunable Filters", IEEE Photonics Technology Letters, vol. 10, No. 6, Jun. 1998, 3 pages.

Yasuki Sakurai, et al., "LCOS-Based 4×4 Wavelength Cross-Connect Switch for Flexible Channel Management in ROADMs", Optical Fiber Communication Conference/National Fiber Optic Engineers Conference, Mar. 6-10, 2011, DSA Technical Digest (CD) (Optical Society of America, 2011), paper OTuM4, ISBN: 978-1-55752-906-0, 3 pages.

D. Ben-Tzvi, et al., "Optical Flow From Constraint Lines Parametrization", Pattern Recognition, vol. 26, No. 10, pp. 1549-1561, Oct. 1993, 13 pages.

* cited by examiner

OPTICAL AMPLIFIERS WITH LIQUID CRYSTAL DEVICE

TECHNICAL FIELD

The present disclosure relates to optical amplifiers.

BACKGROUND

Optical amplifiers have been used extensively for transmission of optical signals in communication systems. Doped fiber amplifiers (DFAs) are optical amplifiers that use a doped optical fiber as a gain medium to amplify an optical signal. The signal to be amplified and a pump laser are multiplexed into the doped fiber, and the signal is amplified through interaction with the doping ions. The most common example is the Erbium Doped Fiber Amplifier (EDFA), in which the core of a silica fiber is doped with trivalent erbium ions and can be efficiently pumped with a laser.

A lot of technological improvements have been made since the first EDFA was produced in the 1980s. Some components, however, are still required in each EDFA. For example, a Gain Equalizer filter is required to equalize channels. In addition, because the gain profile of the doped fiber is not equal for all frequency regions, a Variable Optical Attenuator (VOA) is required to implement a Variable Gain Amplifier (VGA). A side effect of the VGA is that there is only one gain point where the Noise Figure (NF) is optimized. Lower gain values have degraded NFs. For higher gains, the amplifier shows a "tilted" spectrum.

DESCRIPTION OF EXAMPLE EMBODIMENTS

Overview

Techniques are provided for amplifying optical signals for transmission through an optical communication system. An optical amplifier, for example, an EDFA, may have a liquid crystal device to replace the conventional Gain Equalizer filter and Variable Optical Attenuator. The liquid crystal device may provide higher precision with respect to actual output spectrum compared to a gain flattening filter (GFF). Moreover, the liquid crystal device may provide more precise tilt control and less penalizing noise figure. In addition, variable gain may be provided by the liquid crystal device instead of by a VOA. By using the liquid crystal device, the functionalities of a gridless gain equalizer may be embedded into an optical amplifier.

In one embodiment, an optical amplifier may comprise a first gain stage and a second gain stage. Each of the first and second gain stages may comprise a laser pump and an active fiber. A first liquid crystal device may be coupled between an output of the first gain stage and an input of the second gain stage. A control unit may be coupled to the first and second gain stages, and the first liquid crystal device and is configured to control the first and second gain stages, and the first liquid crystal device to provide a switchable gain. A light may pass through the first gain stage and may be amplified by the first gain stage. The light amplified by the gain stage may then pass through the first liquid crystal device and may be filtered by the first liquid crystal device. The filtered light may pass through the second gain stage and may be amplified by the gain stage. In optical amplifiers having more than two gain stages, a liquid crystal device may be coupled between two neighboring gain stages to provide the switchable gain.

The use of a liquid crystal device in an optical amplifier improves gain compensation and control of the optical amplifier.

Example Embodiments

Figure 1A:
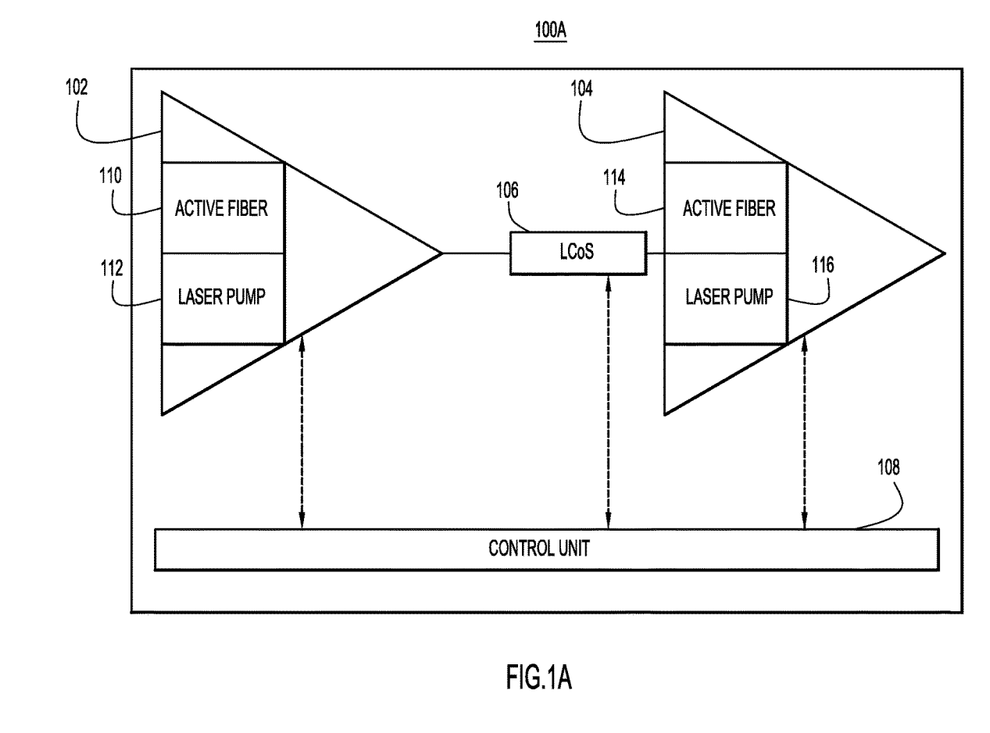
FIG. 1A is a block diagram illustrating an optical amplifier according to an example embodiment.

Reference is made first to FIG. 1A, in which a block diagram shows an optical amplifier 100A according to an example embodiment. The optical amplifier 100A may comprise a first gain stage 102, a second gain stage 104, a liquid crystal device 106 and a control unit 108. The first gain stage 102 may comprise an active fiber 110 and a laser pump 112. The second gain stage 104 may comprise an active fiber 114 and a laser pump 116. The liquid crystal device 106 may be coupled between an output of the first gain stage 102 and an input of the second gain stage 104. The first gain stage 102, the second gain stage 104 and the liquid crystal device 106 may all be coupled to the control unit 108 and controlled by the control unit 108.

The first gain stage 102 and second gain stage 104 may be controlled by the control unit 108 to provide amplification to light passing through the gain stages. The liquid crystal device 106 may be implemented, for example, by a Liquid Cristal on Silicon (LCoS) device and controlled by the control unit 108 to provide a switchable gain. In one embodiment, the LCoS may be implemented as a "gridless" device which may provide a quasi-continuous shaping of C-band optical spectrum.

The liquid crystal device 106 may provide higher precision with respect to an actual output spectrum compared to a conventional gain flattening filter. Moreover, the liquid crystal device 106 may provide variable gain, more precise tilt control and less penalizing noise figure.

Figure 1B:
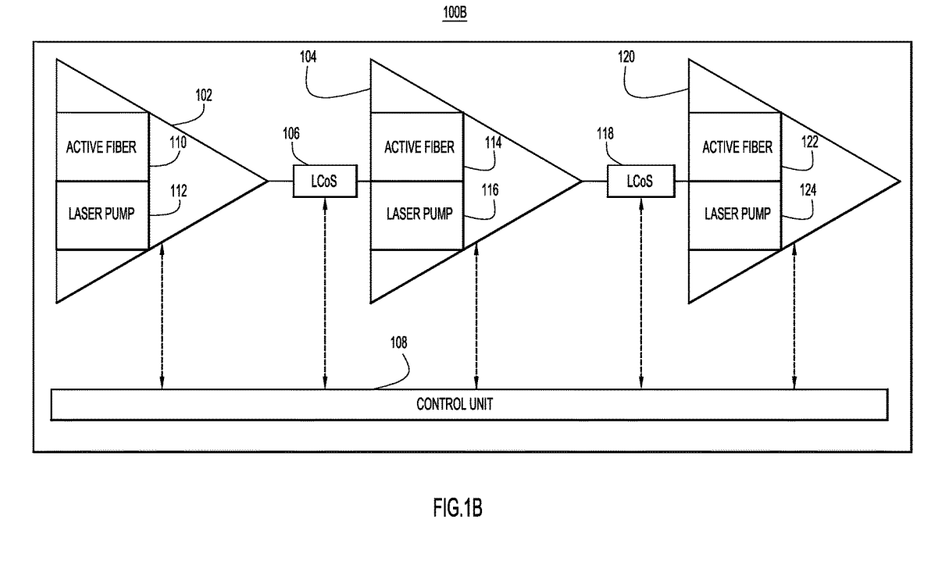
FIG. 1B is a block diagram illustrating an optical amplifier according to another example embodiment.

FIG. 1B illustrates an optical amplifier 100B according to another example embodiment. The optical amplifier 100B may comprise more than two gain stages. As shown in FIG. 1B, the optical amplifier 100B may comprise a first gain stage 102, a second gain stage 104, a third gain stage 120, a first liquid crystal device 106, a second liquid crystal device 118 and a control unit 108. Just like the optical amplifier 100A as shown in FIG. 1A, the first gain stage 102 may comprise an active fiber 110 and a laser pump 112. The second gain stage 104 may comprise an active fiber 114 and a laser pump 116. The liquid crystal device 106 may be coupled between an output of the first gain stage 102 and an input of the second gain stage 104. In addition to those components shown in the optical amplifier 100A, the optical amplifier 100B may have the liquid crystal device 118 coupled between an output of the second gain stage 104 and an input of the third gain stage 120. The third gain stage 120 may comprise an active fiber 122 and a laser pump 124. The liquid crystal device 118 and third gain stage 120 may also be coupled to the control unit 108 and controlled by the control unit 108. In one embodiment, the liquid crystal device 118 may also be implemented by an LCoS device and controlled by the control unit 108 similar to the liquid crystal device 106.

The optical amplifier 100B may be representative of embodiments having more than two gain stages. In some other embodiments, an optical amplifier may have three or more gain stages with liquid crystal devices coupled between each two neighboring gain stages.

Figure 4:
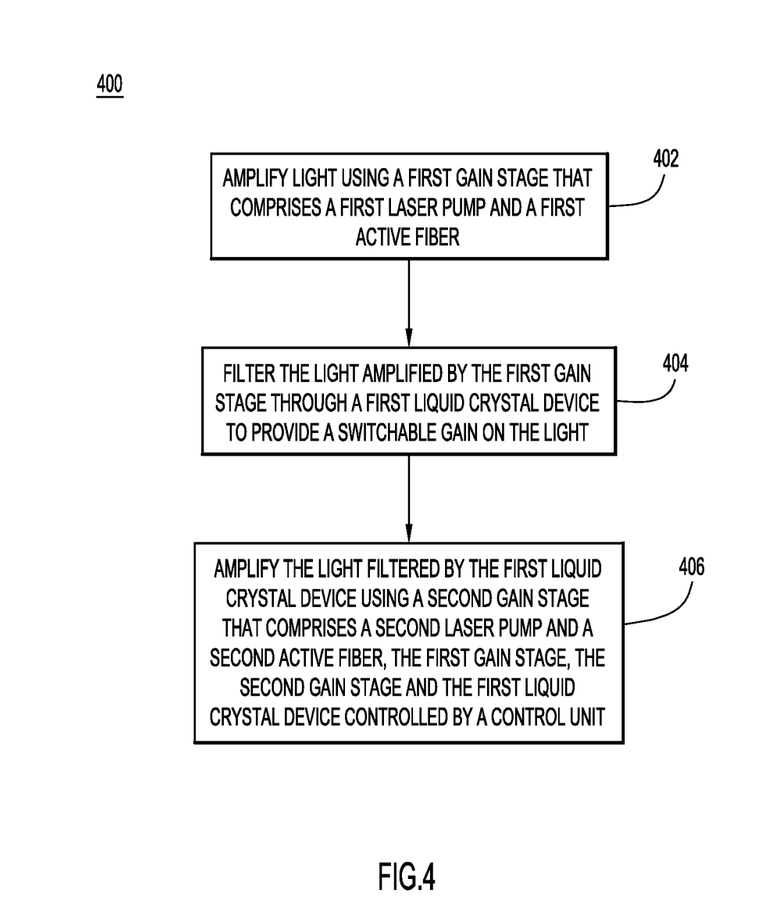
FIG. 4 is a flow chart illustrating, at a high-level, operations performed to amplify optical signal using an optical amplifier according to an example embodiment.

In some embodiments, the control unit 108 may include a processor and memory (not shown), or may be implemented by an application specific integrated circuit (ASIC) or digital signal processor (DSP). The processor may be, for example, a microprocessor, a microcontroller, systems on a chip (SOCs), or other fixed or programmable logic. The memory may include read only memory (ROM), random access memory (RAM), magnetic disk storage media devices, optical storage media devices, flash memory devices, electrical, optical, or other physical/tangible memory storage devices. The memory may be separate or part of the processor. Thus, in general, the memory may comprise one or more tangible (e.g., non-transitory) computer readable storage media (e.g., a memory device) encoded with software comprising computer executable instructions and when the software is executed (by the processor) it is operable to perform the operations described herein in connection with the optical amplifier (e.g., 100A or 100B). To this end, the memory may store software instructions that, when executed by the processor, cause the processor to perform a variety of operations for light amplification/filtering described herein. For example, the memory may store instructions for the processor to perform the operations described herein in connection with FIGS. 1A and 1B above and the process 400 as shown in FIG. 4 and described below. Process 400 may also be implemented in hardware using hardware logic, or be implemented in a combination of both hardware and software.

The functions of the control unit 108 may be implemented by a processor or computer readable tangible non-transitory medium encoded with instructions or by logic encoded in one or more circuits (e.g., embedded logic such as an application specific integrated circuit (ASIC), digital signal processor (DSP) instructions, software that is executed by a processor, etc.), wherein the memory may store optical parameters for gain stages and the liquid crystal device, or functions described herein (and/or to store software or processor instructions that are executed to carry out the computations or functions described herein). Thus, functions of the process 400 may be implemented with fixed logic or programmable logic (e.g., software or computer instructions executed by a processor or field programmable gate array (FPGA)).

The optical amplifiers according to the present disclosure (e.g., 100A and 100B) may provide more simple manufacturability and higher performance/flexibility compared to conventional amplifiers. By using the liquid crystal device(s) 106 (and 118), the functionalities of a gridless gain equalizer may be embedded into the optical amplifier 100A (and 100B). Further, a Dynamic Gain Equalizer (DGE) may be embedded in the optical amplifier. In one embodiment, two solutions may be mixed, for example, by switching over two or more active coils to make a switchable optical amplifier (e.g., EDFA) but replacing the VOA and GFF with the liquid crystal device (e.g., LCoS). Embodiments of the optical amplifiers (e.g., 100A and 100B) may eliminate the need of Gain Equalizer and further increase the capability of an optical amplifier to provide variable gain with less degraded optical parameters.

The liquid crystal device (e.g., LCoS) may be implemented as a VGA to replace the functions of the VOA and GFF. Thus, it may provide functionalities typically achieved in different functional blocks of a conventional optical amplifier. For example, an active fiber gain profile may be determined by "fiber inversion," which is the main parameter to determine the fiber gain. Once the optical amplifier (e.g., EDFA) parameters are determined (e.g., active fiber type/length, pump level, gain), a GFF profile may be derived. The GFF may then compensate a frequency region of the active fiber with higher gain by introducing some amount of frequency selective loss. In embodiments of optical amplifiers 100A and 100B, the GFF may be implemented by the liquid crystal device (e.g., LCoS). At the same time, the liquid crystal device (e.g., LCoS) may implement the VGA by keeping the active gain fixed and introducing some amount of loss with the amplifier (e.g., EDFA) schema through configurable GFF (e.g., attenuation in place of VOA). By using the liquid crystal device (e.g., LCoS) to implement a configurable GFF, the VGA may be obtained more efficiently.

Further, the liquid crystal device (e.g., LCoS) may provide a flexible GFF profile adapted to provide a Raman-assisted transmission bandwidth. The filter patterns provided by the liquid crystal device (e.g., LCoS) may include complex filter patterns such as those used in modern systems, such as Cisco System's "Flex Spectrum" optical systems and equipment. For example, a step-function filter shape may be programmed to block or enhance a portion of the spectrum. The blocking function may be used in a variety of applications, including, for example, spectrum reuse after channels drop in a backbone, limiting the number of channels hitting a coherent receiver, cancelling ASE in "TeraStream like" optical systems, and implementing a "pay-as-you" grove strategy (e.g., licensing to have more EDFA bandwidth available). The enhancing function may be used, for example, for optimizing optical amplifier (e.g., EDFA) power to support long reach channels and limiting optical reach ("pay-for-performance").

The liquid crystal device (e.g., LCoS) may also be more effective in correcting tilt with a more precise tilt profile. The switchable gain provided by the liquid crystal device may be compatible with Flex Spectrum technology, such as a "gridless" device using LCoS in a Reconfigurable Optical Add and Drop Module (ROADM). It has better noise figure performance in a wider gain range. Moreover, the liquid crystal device may work as a Dynamic Gain Equalizer and may be implemented without an embedded Optical Channel Monitor (OCM) (Open Loop Control) or assisted by an OCM (Closed Loop Control).

Figure 2:
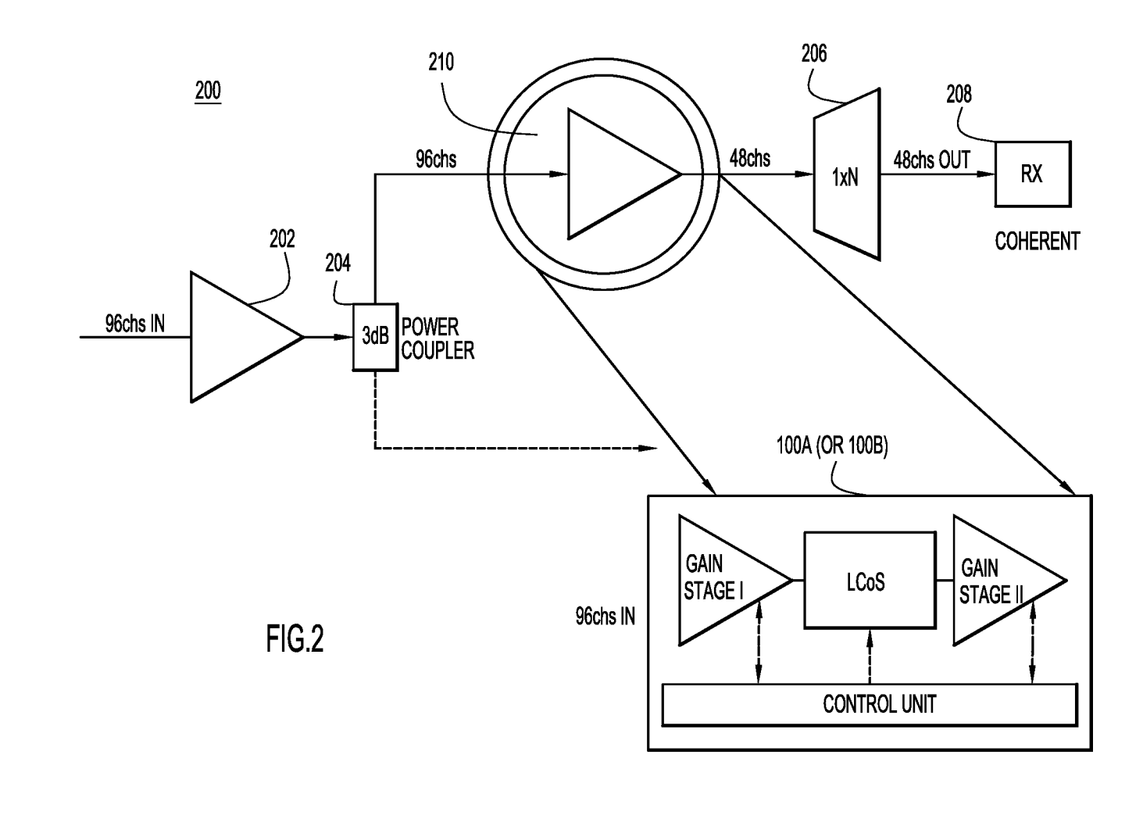
FIG. 2 is a block diagram illustrating a coherent receiver using an optical amplifier according to an example embodiment.

FIG. 2 illustrates an optical coherent receiver 200 with a channel limiter according to an example embodiment. The optical coherent receiver 200 may comprise a front end 202 to receive a 96-channel input signal, a 3 dB power coupler 204, an optical amplifier 210, a 1XN power splitter 206 and a plurality of demux ports 208 (only one is shown for simplicity). The optical amplifier 210 may be an optical amplifier 100A or 100B (only 100A is shown for illustration purposes) that provides many advantages. For example, the optical amplifier 210 may limit the number of channels. As shown in FIG. 2, the optical amplifier 210 may output 48 channels, which may be equal to the number of demux ports 208. Moreover, the optical amplifier 210 may provide the same output power on a limited number of channels (thus providing more power per channel) and have better channel equalization by fixing the worst case and maintaining all channels at the same power (e.g., +3 db of power per channel).

Figure 3:
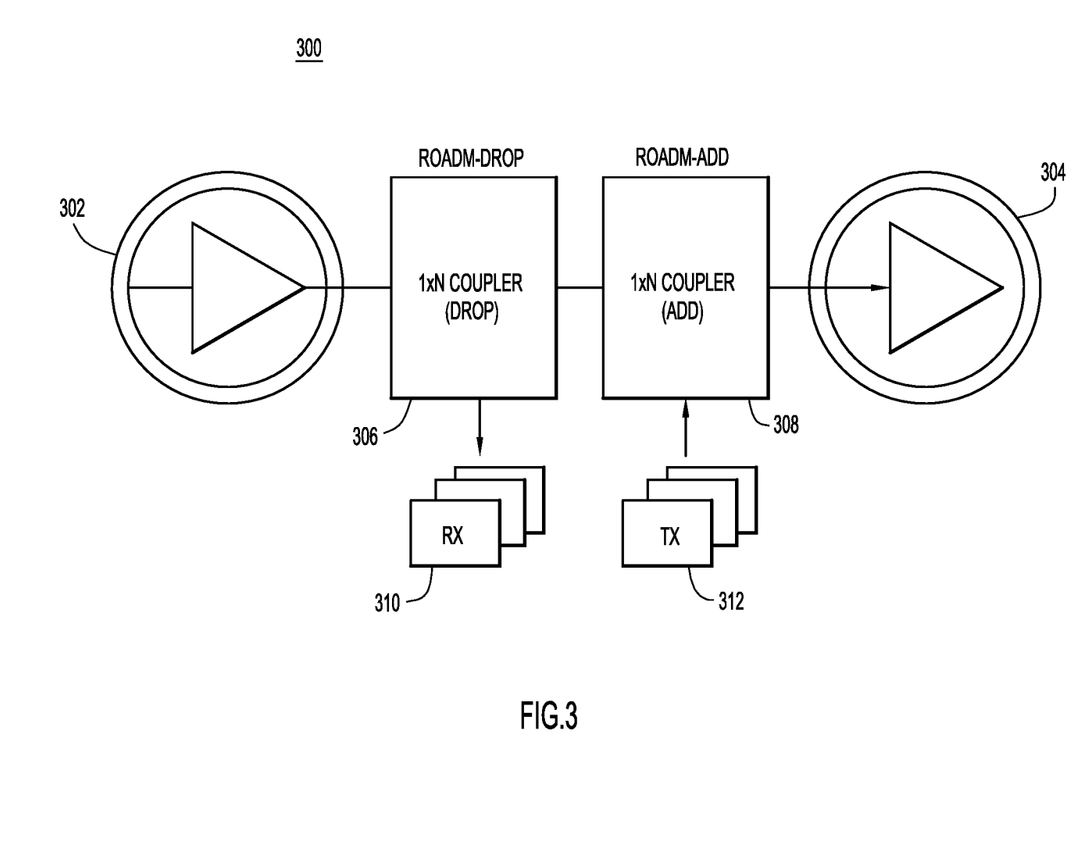
FIG. 3 is a block diagram illustrating elimination of amplified spontaneous emission (ASE) using optical amplifiers according to an example embodiment.

FIG. 3 shows elimination of ASE using optical amplifiers according to an example embodiment. A TeraStream system 300 may comprise an optical amplifier 302, a 1xN Coupler 306, a 1xN Coupler 308 and an optical amplifier 304. The TeraStream system 300 may be a simplified Dense Wavelength Division Multiplexing (DWDM) architecture with filtering ADD/DROP devices replaced by the optical couplers 306 and 308. The optical coupler 306 may be coupled to a plurality of demux ports 310 dropping channels of signals and the optical coupler 308 may be coupled to a plurality of demux ports 312 for adding channels of signals.

In a conventional TeraStream system, channels added may also carry with them amplifier noise from previous amplifier stages and the amplifier noise may accumulate on the added channel. The optical amplifiers 302 and 304 may be optical amplifiers 100A or 100B. The TeraStream system 300 may rely on the optical amplifiers 302 and 304 to differentiate the amount of gain between spectral regions having channels and having no channels, thus avoiding ASE accumulation. A control plane (e.g., the control unit 108 in an optical amplifier 100A or 100B), for example, may inform the optical amplifiers 302 and 304 of the spectral regions used by active traffic, Thus, the optical amplifiers 302 and 304 may limit the gain on un-used spectral regions. For example, the liquid crystal device 106 of optical amplifiers 302 and 304 may be configured to completely block the un-used spectral regions. In one embodiment, as an alternative, an Optical Channel Monitor (OCM) (Closed Loop Control) may be implemented in the optical amplifier (100A or 100B) to assist the process.

Using the liquid crystal devices (e.g., LCoS) in optical amplifiers according to the present disclosure may provide a different approach for a DGE that focuses on channel equalization. An optical amplifier 100A (or 100B) may be configured to split amplification in different subsets (e.g., ASE vs. Channels).

Referring to FIG. 4, an example flowchart is shown that generally depicts the operations of an optical amplifier, according to the techniques described herein. At 402, at an optical amplifier (e.g., optical amplifier 100A or 100B shown in FIGS. 1A and 1B), light may be amplified using a first gain stage that comprises a first laser pump and a first active fiber. At 404, the light amplified by the first gain stage may be passed through a first liquid crystal device and may be filtered by the first liquid crystal device. The first liquid crystal device may provide a switchable gain on the light. In one embodiment, the first liquid crystal device may be implemented in a Liquid Crystal on Silicon (LCoS) device. At 406, the light filtered by the first liquid gain stage may be amplified by a second gain stage that comprises a second laser pump and a second active fiber. The first gain stage, the second gain stage and the liquid crystal device may be controlled by a control unit (e.g., the control unit 108 shown in FIGS. 1A and 1B).

It should be appreciated that the optical amplifiers 100A and 100B may include fewer or more modules apart from those shown in FIGS. 1A and 1B. In another example, the control operations to be implemented by the control unit 108 may be in the form of firmware that is processed by Application Specific Integrated Circuits (ASICs), which may be integrated into a circuit board. Alternatively, the control operations to be implemented by the control unit 108 may be in the form of one or more logic blocks included in a programmable logic device (e.g., a field-programmable gate array). Moreover, the optical amplifiers 100A and 100B may be adapted, and/or additional structures may be provided, to provide alternative or additional functionalities beyond those specifically discussed in reference to FIG. 4. Modifications or additions to the structures described in relation to FIGS. 1A and 1B to implement these alternative or additional functionalities are envisioned without departing from the scope and spirit of the embodiments presented herein.

The techniques provided herein may provide a way for amplifying and filtering optical signals passing through an optical amplifier. In the embodiments described herein, liquid crystal device(s) may be used in the optical amplifiers to provide a switchable gain and flexible gain profile. The optical amplifiers using such techniques may also eliminate ASE and provide improved gain compensation and tilt control. Accordingly, better performance and flexibility may be provided as well as simplified manufacturing.

In summary, in one form, an optical amplifier is provided. The optical amplifier may comprise a first gain stage comprising a first laser pump and a first active fiber; a second gain stage comprising a second laser pump and a second active fiber; a first liquid crystal device coupled between an output of the first gain stage and an input of the second gain stage; and a control unit coupled to the first gain stage, the first liquid crystal device and the second gain stage and configured to control the first liquid crystal device to provide a switchable gain on light amplified by the first gain stage.

In another form, method to amplify light using an optical amplifier is provided. The method may comprise amplifying the light using a first gain stage that comprises a first laser pump and a first active fiber; filtering the light amplified by the first gain stage through a first liquid crystal device to provide a switchable gain on the light amplified by the first gain; amplifying the light filtered by the first liquid crystal device using a second gain stage that comprises a second laser pump and a second active fiber; and controlling the first gain stage, the first liquid crystal device and the second gain stage to provide the switchable gain.

In yet another form, an optical amplifier is provided. The optical amplifier may comprise a plurality of gain stages including a first gain stage to receive an input optical signal, an end gain stage to output an amplified optical signal, and one or more intermediate gain stages between the first gain stage and the end gain stage, each of the plurality of gain stages comprising a laser pump and an active fiber; a plurality of liquid crystal devices each coupled between an output of one of the plurality of gain stages and an input of another of the plurality of gain stages; and a control unit coupled to the plurality of gain stages, the plurality of liquid crystal devices and configured to control the plurality of liquid crystal devices to provide switchable gains on the optical signal.

As explained above, the control unit may be configured to provide the switchable gain, including a variable gain, gain flattening filtering, or both variable gain and gain flattening filtering. Moreover, the control unit may be configured to provide the switchable gain to block or remove signal or noise from the light amplified by the first gain stage. Further still, the control unit may be configured to provide the switchable gain including dynamic gain equalization, one or more complex filter patterns, and/or a flexible gain flattening filtering profile adapted to provide a Raman-assisted transmission bandwidth. The one or more complex filter patterns include a step-function filter shape configured to block or enhance portion(s) of a spectrum of the light amplified by the first gain stage.

Described above are examples. The concepts described herein may be embodied in other specific forms without departing from the spirit or essential characteristics thereof. The foregoing examples are therefore to be considered in all respects illustrative and not meant to be limiting. Accordingly, it is intended to encompass all such alterations, modifications and variations that fall within the spirit and scope of any claims filed in applications claiming priority hereto interpreted in accordance with the breadth to which they are fairly, legally and equitably entitled.

What is claimed is:

1. An optical amplifier comprising:
   a first gain stage comprising a first laser pump and a first active fiber;
   a second gain stage comprising a second laser pump and a second active fiber;
   a first liquid crystal device coupled between an output of the first gain stage and an input of the second gain stage; and
   a control unit coupled to the first gain stage, the first liquid crystal device and the second gain stage and configured to control the first liquid crystal device to provide a switchable gain on light amplified by the first gain stage, wherein the control unit is configured to provide the switchable gain including dynamic gain equalization, one or more complex filter patterns, and/or a flexible gain flattening filtering profile adapted to provide a Raman-assisted transmission bandwidth.

2. The optical amplifier of claim 1, further comprising:
   a third gain stage comprising a third laser pump and a third active fiber; and
   a second liquid crystal device coupled between an output of the second gain stage and an input of the third gain stage, wherein the control unit is also coupled to the third gain stage and the second liquid crystal device and configured to control the second liquid crystal device to provide a switchable gain on light amplified by the second gain stage.

3. The optical amplifier of claim 1, wherein the first liquid crystal device is a Liquid Crystal on Silicon (LCoS) device.

4. The optical amplifier of claim 1, wherein the control unit is configured to provide the switchable gain including a variable gain, gain flattening filtering, or both variable gain and gain flattening filtering.

5. The optical amplifier of claim 1, wherein the control unit is configured to provide switchable gain to block or remove signal or noise from the light amplified by the first gain stage.

6. The optical amplifier of claim 1, wherein the one or more complex filter patterns include a step-function filter shape configured to block or enhance portion(s) of a spectrum of the light amplified by the first gain stage.

7. A method to amplify light using an optical amplifier, comprising:
   amplifying the light using a first gain stage that comprises a first laser pump and a first active fiber;
   filtering the light amplified by the first gain stage through a first liquid crystal device to provide a switchable gain on the light amplified by the first gain; and
   amplifying the light filtered by the first liquid crystal device using a second gain stage that comprises a second laser pump and a second active fiber; and
   controlling the first gain stage, the first liquid crystal device and the second gain stage to provide the switchable gain, wherein the switchable gain includes dynamic gain equalization, one or more complex filter patterns, and/or a flexible gain flattening filtering profile adapted to provide a Raman-assisted transmission bandwidth.

8. The method of claim 7, further comprising:
   filtering the light amplified by the second gain stage through a second liquid crystal device to provide a second switchable gain on the light; and
   amplifying the light filtered by the second liquid crystal device using a third gain stage that comprises a third laser pump and a third active fiber;
   wherein controlling comprises controlling the second liquid crystal device to provide the second switchable gain on the light.

9. The method of claim 7, wherein the first liquid crystal device is a Liquid Crystal on Silicon (LCoS) device.

10. The method of claim 7, wherein the switchable gain includes a variable gain, gain flattening filtering, or both variable gain and gain flattening filtering.

11. The method of claim 7, wherein the switchable gain includes blocking or removing signal or noise from the light amplified by the first gain stage.

12. The method of claim 7, wherein the one or more complex filter patterns include a step-function filter shape programmed to block or enhance portion(s) of a spectrum of the light amplified by the first gain stage.

13. An optical amplifier comprising:
   a plurality of gain stages including a first gain stage to receive an input optical signal, an end gain stage to output an amplified optical signal, and one or more intermediate gain stages between the first gain stage and the end gain stage, each of the plurality of gain stages comprising a laser pump and an active fiber;
   a plurality of liquid crystal devices each coupled between an output of one of the plurality of gain stages and an input of next one of the plurality of gain stages; and
   a control unit coupled to the plurality of gain stages and to the plurality of liquid crystal devices, and configured to control the plurality of liquid crystal devices to provide switchable gain on the optical signal, wherein the switchable gains include one or more of: dynamic gain equalization, one or more complex filter patterns, and/or a flexible gain flattening filtering profile adapted to provide a Raman-assisted transmission bandwidth.

14. The optical amplifier of claim 13, wherein the plurality of liquid crystal devices are Liquid Crystal on Silicon (LCoS) devices.

15. The optical amplifier of claim 13, wherein the control unit is configured to provide the switchable gain including variable gain, gain flattening filtering, or both variable gain and gain flattening filtering.

16. The optical amplifier of claim 13, wherein the control unit is configured to provide switchable gain to block or remove signal or noise from the amplified optical signal.

17. The optical amplifier of claim 13, wherein the one or more complex filter patterns include a step-function filter shape programmed to block or enhance portion(s) of a spectrum of light passing through the optical amplifier.

18. The optical amplifier of claim 1, wherein the first active fiber and the second active fiber are Erbium Doped fibers.

19. The method of claim 7, wherein the first active fiber and the second active fiber are Erbium Doped fibers.

20. The optical amplifier of claim 13, wherein the active fibers in the plurality of gain stages are Erbium Doped fibers.

* * * * *